No. 892,519. PATENTED JULY 7, 1908.
J. B. HINCHMAN.
DELIVERY SPOUT FOR MIXING MACHINES.
APPLICATION FILED JUNE 12, 1907.
3 SHEETS—SHEET 3.
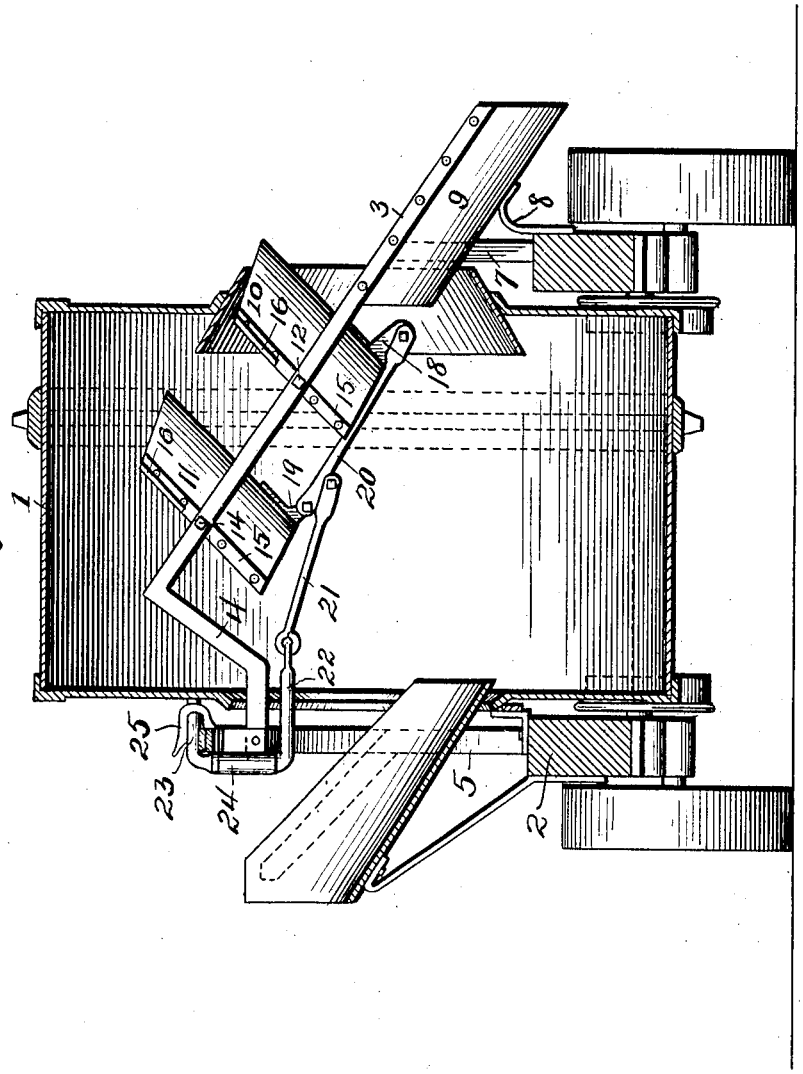

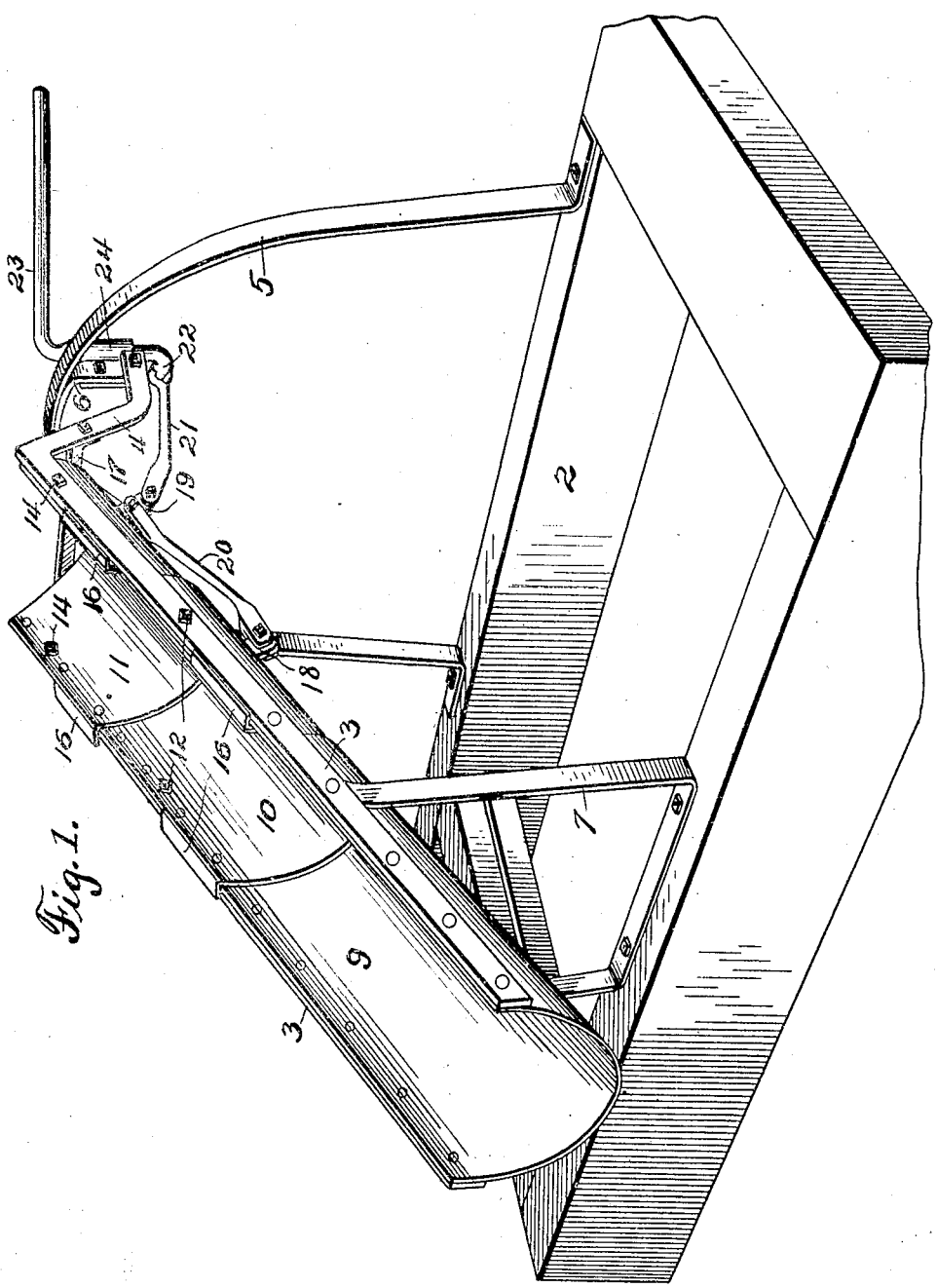

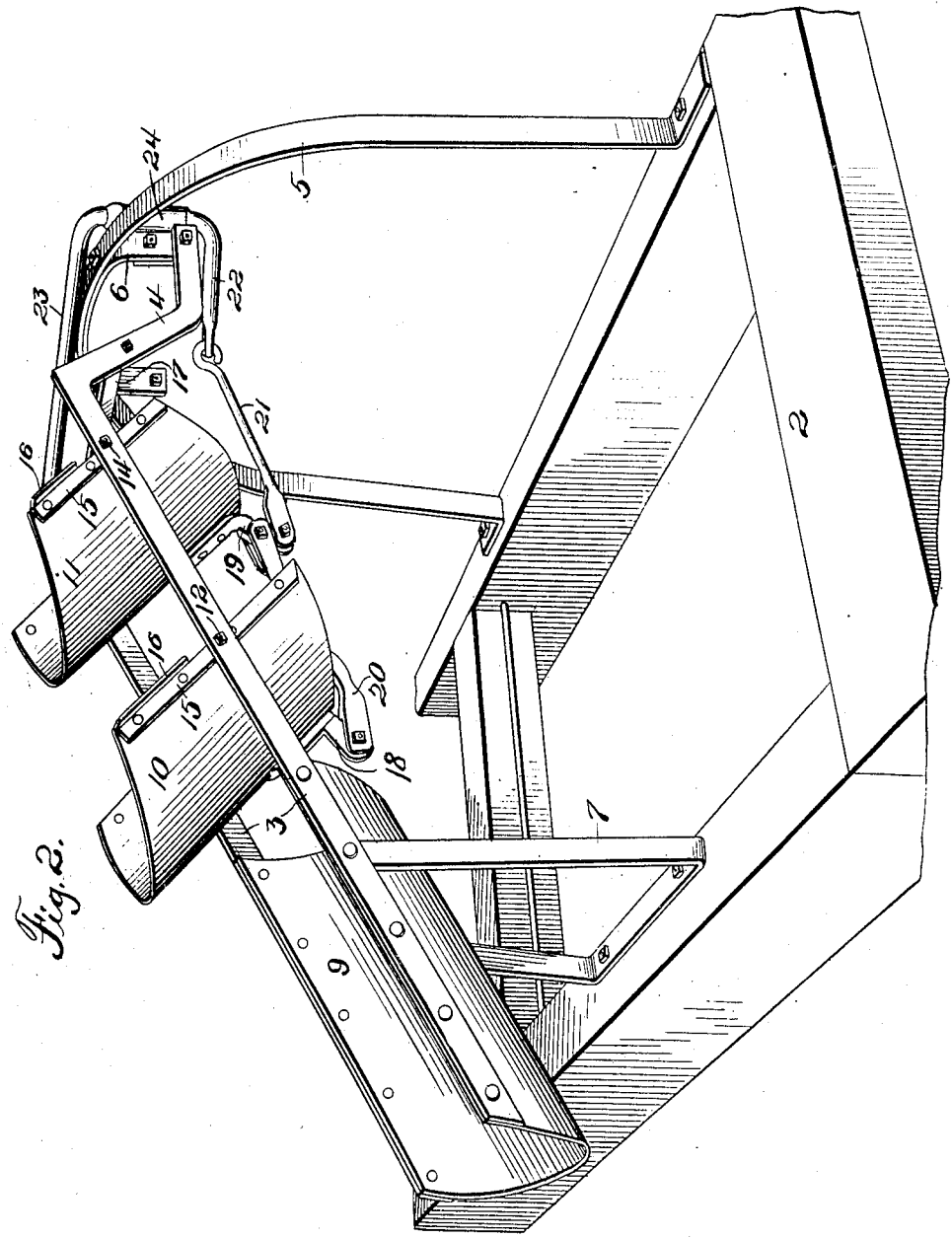

# UNITED STATES PATENT OFFICE.

JAMES B. HINCHMAN, OF DENVER, COLORADO.

DELIVERY-SPOUT FOR MIXING-MACHINES.

No. 892,519.

Specification of Letters Patent.

Patented July 7, 1908.

Application filed June 12, 1907. Serial No. 378,525.

*To all whom it may concern:*

Be it known that I, JAMES B. HINCHMAN, a citizen of the United States of America, residing at Denver, in the city and county of Denver and State of Colorado, have invented certain new and useful Improvements in Delivery-Spouts for Mixing-Machines, of which the following is a specification, reference being had therein to the accompanying drawing.

This invention relates to certain new and useful improvements in "spouts for mixing machines", and relates more particularly to a discharge spout for that particular type of mixing machines generally designated as "drum-mixers".

The invention has for its object the provision of a novel form of spout extending from within the mixer to a point outside of the same, the spout being in sections, one of which is stationary and one or more of which are made movable whereby to be placed in position for discharge material from the drum, or permitting the material to fall through the spout, as desired.

A further object of the invention is to provide a delivery spout in which the movable sections may be easily and quickly manipulated to place the same in the desired position, and also to provide novel means whereby said sections may be manipulated from the exterior of the mixing machine.

A practical embodiment of the invention is shown in the accompanying drawings and will be specifically described herein, but I would have it understood that I do not limit myself to the precise construction shown and described, as various details of construction may be altered without departing from the general spirit of the invention.

In the drawings:—Figure 1 is a perspective view of the delivery spout of a mixer constructed in accordance with my invention, the supporting frame only of the mixing machine being shown, and the spout sections being shown in the closed position. Fig. 2 is a similar view showing the spout sections in the open position. Fig. 3 is a transverse vertical sectional view of a mixing machine showing my improved spout therein, the movable spout sections being shown in the open position.

As the subject-matter of this application is confined solely to the delivery spout and the manner of operating the movable sections thereof, brief reference only will be had to the structure of the mixing machine. In Fig. 3 I have shown the spout in the position it occupies in the drum of the mixing machine. The drum 1 shown, is of the type described and claimed in my application for improvement in mixing machines, filed May 28, 1907. This drum is supported from a suitable frame 2, which in turn, is usually supported on a truck, so that it can be moved as desired.

The delivery spout as shown in this application comprises parallel side rails 3, which are arranged at an incline, and extend through the discharge opening of the drum, the outer ends of said rails being some distance beyond the drum, and the inner ends of said rails terminating in angular arms 4, the free ends of which are supported from an arch-shaped standard or brace 5, secured to one of the side rails of the supporting frame 2. In the present instance, the free ends of the arms 4 are shown as connected to the depending ends of an arched strap or brace 6, carried by the standard 5. It will be evident that the particular manner of connecting the ends of the arms 4, so as to support the same from the standard 5, is immaterial; obviously this may be done in many different ways without departing from the spirit of the invention. The side rails 3, are supported at a point outside the discharge end of the drum by a standard 7, secured to one of the side rails of the frame 2, and the delivery spout may also be further supported at the discharge end by bracket 8 as seen in Fig. 3.

The spout *per se* is made up of a plurality of sections. I have herein shown and will describe the same as composed of three sections, one of which is stationary, and the other two of which are movable, but obviously, the spout could be made in two sections, or of more than three sections, without departing from the spirit of the invention. In the illustration herewith, the outer spout section 9 is rigidly secured to the side rails 3. The inner end of this stationary spout section is approximately in line with the end of the mixing drum. The spout sections 10 and 11 are hung to swing between the side rails, and are so positioned that when moved to closed position, the section 10 slightly overlaps the inner end of the stationary section 9, and the section 11 slightly overlaps the inner end of section 10, whereby to form a continuous spout for the discharge of the material from the drum. The spout sections 10 and 11 are pivoted at 12, 14 respectively, substantially midway between the ends. In order to give the desired strength and rigidity to the spout sections 10 and 11, the same are secured to strips 15, and each movable spout section has over-hanging flanges 16 along the side edges at its forward end, which engage and rest upon the side rails 3 when the spout sections 10 and 11 are in the closed position shown in Fig. 1. The side rails 3, may be braced at the rear end by a cross brace 17 as seen in Figs. 1 and 2.

In order to manipulate the movable spout sections 10 and 11 from the exterior of the drum, I provide the spout section 10 with a depending lug 18, and the spout section 11 with a depending lug 19, these lugs depending from the underneath face of the spout sections at the rear end thereof. The lugs 18 and 19 are connected by a link 20 pivoted at its ends to said lugs. The lug 19 is also connected by a link 21 with the inner end 22 of an operating lever or crank 23 which is journaled in a bearing 24 which in the present instance is shown as being carried by one of the depending ends of the strap 6. It will, of course be evident that the bearing 24 may be supported at any desirable stationary point of the mixing machine. The crank or lever 23 is held in the position to maintain the movable spout sections open as shown in Figs. 2 and 3 by means of a suitable catch 25, carried by the standard 5 or any desirable part of the mixing machine.

The operation of the spout will, it is thought, be evident, by reference to Fig. 3 of the drawings. It is to be understood, of course that the mixing drum therein shown is provided with carrying-wings by means of which the material within the drum is carried upwardly to a point beyond the center of gravity, at which time the carrying-wings discharge the material and it falls again to the lowest part of the drum, in order that the material will be thoroughly agitated or mixed as the drum is revolved. So long as the spout sections 10 and 11 are held in the open position as shown in Figs. 2 and 3, the material which is discharged at a point above the spout sections will fall through the spout to be again carried up by the wings. When, however, the material has been agitated or mixed the crank or lever 23 is released from its catch 25 and moved to the position shown in Fig. 1, so as to bring the spout sections 10 and 11 into closed position, shown in said view, and in this position, the material as it is discharged from the carrying-wings into the spout, is carried off by the latter to a point outside the drum ready for use.

Having fully described my invention, what I claim as new and desire to secure by Letters Patent, is:—

1. A delivery spout comprising a fixed spout section, side rails supporting said spout section, two movable spout sections pivoted to swing between said side rails and each provided with over-hanging flanges to engage said side rails, and means for actuating said spout sections to swing them on their pivots into open or closed positions.

2. A delivery spout embodying a fixed spout section, and a plurality of shiftable sections pivoted to swing into open and closed positions and adapted to overlap each other and the fixed section when the shiftable sections are moved to a closed position, a link connecting said shiftable sections, a lever connected to one of the shiftable sections for actuating the same, and means for securing said lever in position to hold the movable spout sections in open position.

3. In combination, supporting side rails, a spout section fixed to said side rails, two movable spout sections mounted to swing between the side rails, means connecting said movable spout sections, operating means for moving the movable spout sections to open position, and means for securing said movable spout sections in the open position.

4. The combination with an inclined support, of a spout embodying a plurality of sections, one of said sections fixed to said support and the other of said sections pivotally connected to said support at the rear of the fixed section and capable of being shifted to open and closed position, said shiftable section when moved to closed position overlapping said stationary section, combined with means connected with one end of said shiftable section for moving it to open and closed position.

5. The combination with an inclined support, of a spout embodying a plurality of sections, one of said sections fixed to said support and the other of said sections pivotally connected to said support at the rear of the fixed section and capable of being shifted to open and closed position, said shiftable section provided with longitudinally extending flanges adapted to overlap the support when the shiftable section is moved to closed position, combined with means for moving said shiftable section to open and closed position.

6. The combination with a support consisting of a pair of side rails connected together at their rear and means for supporting the side rails, of a spout embodying a plurality of sections, one of which is stationary and the other of which is shiftable, said stationary section secured between said side rails at one end thereof and said shiftable section pivotally connected to the side rails, said shiftable section capable of being moved to open and closed position and when in closed position adapted to overlap the stationary section, and means for moving the shiftable section.

7. The combination with a support consisting of a pair of side rails connected together at their rear and means for supporting the side rails, of a spout embodying a plurality of sections, one of which is stationary and the other of which is shiftable, said stationary section secured between said side rails at one end thereof and said shiftable section pivotally connected to the side rails, said shiftable section capable of being moved to open and closed position and when in closed position adapted to overlap the stationary section, said shiftable section provided with longitudinally extending flanges adapted to engage the rails when said section is moved to closed position and means for moving said shiftable section.

8. The combination with a stationary support comprising a pair of side rails, of a spout comprising a plurality of sections supported between said rails, one of said sections being stationary and the other shiftable to open and closed position.

In testimony whereof I affix my signature in the presence of two witnesses.

JAMES B. HINCHMAN.

Witnesses:
L. F. SIEVERS,
CHARLES BROWN.